US006681159B2

(12) United States Patent
Li et al.

(10) Patent No.: US 6,681,159 B2
(45) Date of Patent: Jan. 20, 2004

(54) SPACECRAFT METHODS AND STRUCTURES WITH ENHANCED ATTITUDE CONTROL THAT FACILITATES GYROSCOPE SUBSTITUTIONS

(75) Inventors: Rongsheng Li, Hacienda Heights, CA (US); Jeffrey A. Kurland, Marina Del Rey, CA (US); Alec M. Dawson, Manchester, CT (US); Yeong-Wei A. Wu, Rancho Palos Verdes, CA (US); David S. Uetrecht, Palos Verdes Estates, CA (US)

(73) Assignee: The Boeing Company, Seattle, WA (US)

( * ) Notice: Subject to any disclaimer, the term of this patent is extended or adjusted under 35 U.S.C. 154(b) by 104 days.

(21) Appl. No.: 10/039,488

(22) Filed: Oct. 28, 2001

(65) Prior Publication Data

US 2003/0171855 A1 Sep. 11, 2003

(51) Int. Cl.[7] ............................. B64L 1/00; G05D 1/00; B64G 1/24; B64G 1/28
(52) U.S. Cl. ............................. 701/13; 701/226; 701/8; 701/4; 244/164; 244/165; 244/171
(58) Field of Search .................. 701/13, 8, 4, 226; 244/164, 165, 171; 73/1.77

(56) References Cited

U.S. PATENT DOCUMENTS

| 5,562,266 | A | | 10/1996 | Achkar | 244/171 |
| 5,760,737 | A | * | 6/1998 | Brenner | 342/357.02 |
| 5,949,675 | A | * | 9/1999 | Holmes et al. | 700/37 |
| 6,047,226 | A | * | 4/2000 | Wu et al. | 701/13 |
| 6,108,593 | A | * | 8/2000 | Didinsky et al. | 701/13 |
| 6,263,264 | B1 | | 7/2001 | Herman | 701/13 |
| 6,272,432 | B1 | * | 8/2001 | Li et al. | 701/222 |
| 6,285,927 | B1 | * | 9/2001 | Li et al. | 701/13 |
| 6,317,662 | B1 | * | 11/2001 | Li et al. | 701/13 |
| 6,356,815 | B1 | * | 3/2002 | Wu et al. | 701/13 |
| 6,408,245 | B1 | * | 6/2002 | An et al. | 701/216 |
| 6,454,217 | B1 | * | 9/2002 | Rodden et al. | 244/164 |

OTHER PUBLICATIONS

Reid, D.B., Description of the Milstar attitude determination system, proceedings of the 1997 American control conference, vol. 4, pp. 2313–2322.*

* cited by examiner

Primary Examiner—William A. Cuchlinski, Jr.
Assistant Examiner—Brian J. Broadhead
(74) Attorney, Agent, or Firm—Koppel, Jacobs, Patrick & Heybl (57) ABSTRACT

Methods and structures are provided that enhance attitude control during gyroscope substitutions by insuring that a spacecraft's attitude control system does not drive its absolute-attitude sensors out of their capture ranges. In a method embodiment, an operational process-noise covariance Q of a Kalman filter is temporarily replaced with a substantially greater interim process-noise covariance Q. This replacement increases the weight given to the most recent attitude measurements and hastens the reduction of attitude errors and gyroscope bias errors. The error effect of the substituted gyroscopes is reduced and the absolute-attitude sensors are not driven out of their capture range. In another method embodiment, this replacement is preceded by the temporary replacement of an operational measurement-noise variance R with a substantially larger interim measurement-noise variance R to reduce transients during the gyroscope substitutions.

26 Claims, 7 Drawing Sheets

SPACECRAFT METHODS AND STRUCTURES WITH ENHANCED ATTITUDE CONTROL THAT FACILITATES GYROSCOPE SUBSTITUTIONS

GOVERNMENT RIGHTS

The invention described herein was made in the performance of work under NASA contract number NAS5-98069 and is subject to the provisions of Section 305 of the National Aeronautics and Space Act of 1958 (72 Stat. 435; 42 U.S.C. 2457).

BACKGROUND OF THE INVENTION

1. Field of the Invention

The present invention relates generally to spacecraft and, more particularly, to spacecraft attitude control systems.

2. Description of the Related Art

Figure 1A:
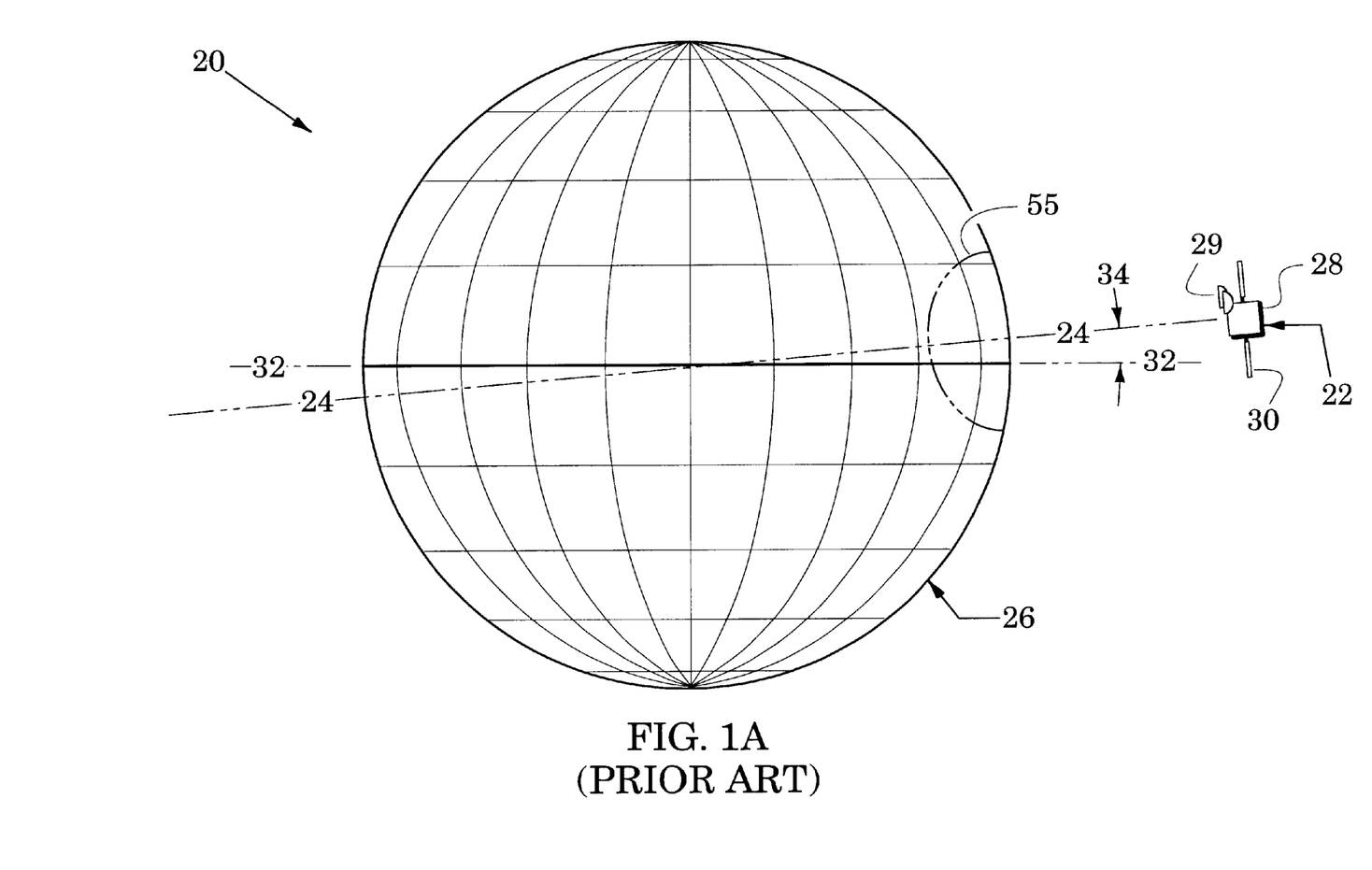
FIG. 1A is a diagram of a conventional spacecraft in an orbit about the earth.

The diagram 20 of FIG. 1A illustrates an exemplary spacecraft 22 that orbits in an orbital plane 24 about the earth 26. The spacecraft has a spacecraft body 28 which carries an antenna system 29 and solar panels 30 that generate power for the spacecraft. Although the spacecraft's orbital plane 24 may be coplanar with the earth's equatorial plane 32, it is shown, for generality, as having an inclination 34.

The spacecraft 20 includes an attitude control system that maintains a spacecraft service attitude which facilitates the performance of the intended service (e.g., communication service) for which the spacecraft was designed. The spacecraft attitude control system typically responds to attitude measurements from at least one absolute-attitude sensor (e.g., a star tracker) and attitude rate measurements from at least one inertial-attitude sensor (e.g., a gyroscope).

The inertial-attitude sensors are generally arranged to provide attitude rate signals that correspond to three axes (e.g., roll, pitch and yaw axes) of an orbital reference system. Because loss of attitude control implies loss of service, spacecraft typically carry redundant sets of inertial-attitude sensors (or a system of sensors from which more than one set can be configured). Accordingly, the spacecraft's service can be maintained by substituting a redundant set of inertial-attitude sensors for a failed initial set. This replacement may also be made for other reasons, (e.g., testing to confirm the condition of the redundant set).

Some spacecraft attitude sensors (e.g., staring earth sensors and sun sensors) have wide fields-of-view and others (e.g., star sensors and precision beacon sensors) have more limited fields-of-view. In particular, star trackers are often used in a "direct-match mode" of operation after initial attitude has been attained. In this mode, the positions and magnitudes of sensed stars are compared and identified with the aid of a stored star catalog. Although this mode facilitates fast, simple processing, it limits the range over which stars can be identified.

Figure 1B:
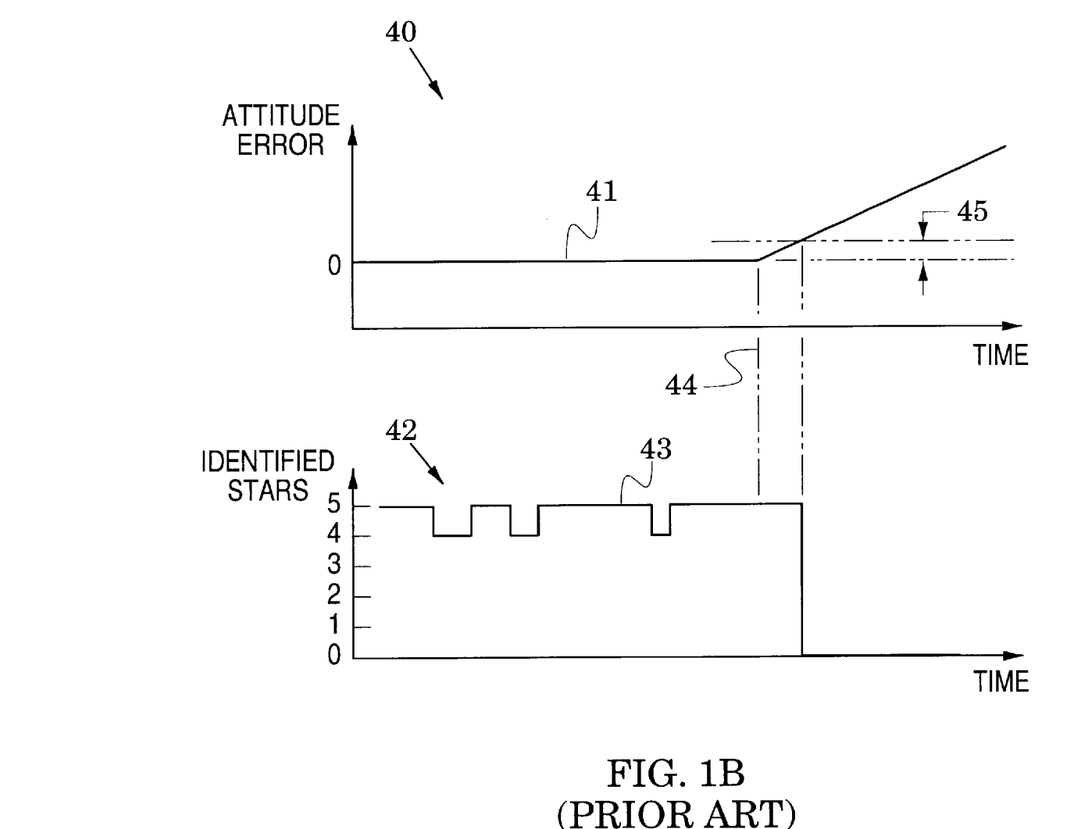
FIG. 1B is a graph that shows attitude error and number of tracked and identified stars in the spacecraft of FIG. 1A when a set of redundant inertial-attitude sensors is substituted for an initial set.

FIG. 1B illustrates an exemplary attitude control system for the spacecraft 22 of FIG. 1A that employs narrow capture range star trackers (e.g., capture range on the order of 0.2 degrees). A graph 40 includes a plot 41 of attitude error about all axes of the local orbital reference and a graph 42 includes a plot 43 of tracked and identified stars. In the simulation, a redundant set of gyroscopes was substituted for an initial set at a time 44.

Plot 41 shows that attitude error about all axes of the local orbital reference (i.e., roll, pitch and yaw axes) remains very low prior to the time 44 and plot 43 shows that at least 4 stars are identified throughout this time. After the time 44, attitude error increases linearly and when it exceeds an error threshold 45, there is a complete loss of identified stars. This degradation of attitude control would cause temporary or even permanent interruption of service of the spacecraft (22 in FIG. 1A).

SUMMARY OF THE INVENTION

The present invention is directed to spacecraft methods and structures that enhance attitude control during gyroscope substitutions. The invention recognizes that the error variances of a substituted set of redundant gyroscopes are initially unknown and will introduce significant errors in attitude estimates. If the capture range of absolute-attitude sensors is not significantly larger than these errors, the attitude control system may drive the sensors out of their capture range which endangers the spacecraft's service.

In response to this recognition, the invention provides methods and structures that temporarily replace an operational process-noise covariance Q of a Kalman filter with a substantially greater interim process-noise covariance Q. This replacement increases the weight given to the most recent attitude measurements and hastens the reduction of attitude errors and gyroscope bias errors. Because greater weight is placed on the most recent attitude measurements and, hence, less weight on the latest predicted attitudes, the error effect of the uncompensated redundant gyroscopes is reduced and the absolute-attitude sensors are not driven out of their capture range.

In another method embodiment, this replacement is preceded by the temporary replacement of an operational measurement-noise variance R with a substantially larger interim measurement-noise variance R to reduce transients during the gyroscope substitutions.

In another method embodiment, an operational error covariance P is temporarily replaced with an substantially greater interim error covariance P.

Method embodiments are also provided for fixed-gain filters.

The novel features of the invention are set forth with particularity in the appended claims. The invention will be best understood from the following description when read in conjunction with the accompanying drawings.

DETAILED DESCRIPTION OF THE INVENTION

Figure 2:
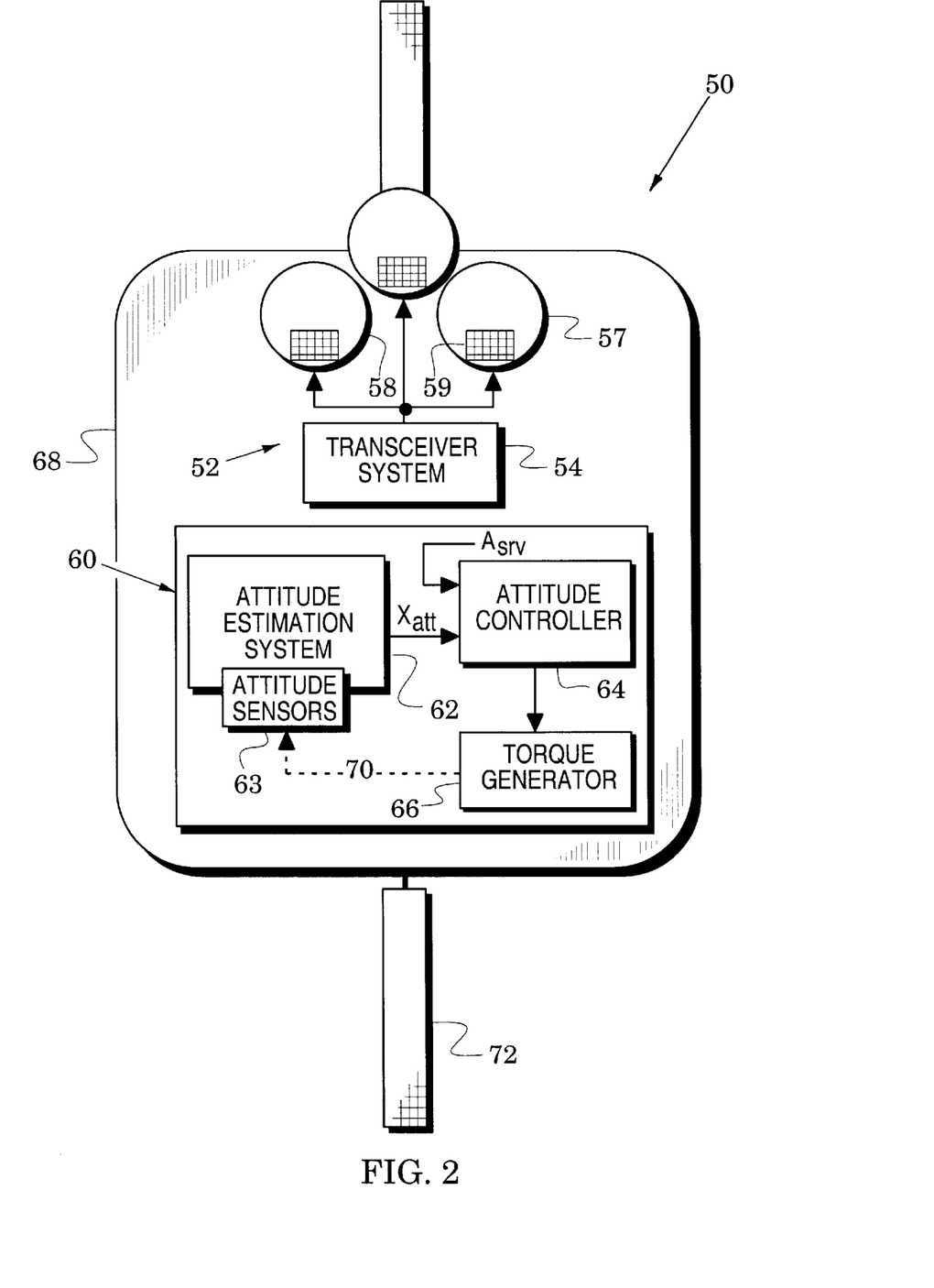
FIG. 2 is a schematized view of a spacecraft which includes an attitude control system of the present invention.

FIG. 2 illustrates a spacecraft 50 which performs a service. For example, the spacecraft may provide a communication service with a communication system 52 that includes a transceiver system 54 which communicates with a service area (e.g., the service area 55 in FIG. 1A) through an antenna system 58 that comprises reflectors 58 and array radiators 59.

In addition, the spacecraft 50 practices control methods of the present invention that maintain a service attitude which facilitates performance of its service. Accordingly, the spacecraft carries an attitude control system 60 which insures that attitude control is not lost during gyroscope substitutions and thereby it insures continuation of the spacecraft's service. To enhance their clarity, operational descriptions of the control system 60 are preceded by the following descriptions of structures of FIGS. 2, 3 and 4.

In particular, the attitude control system 60 of FIG. 2 includes an attitude estimation system 62 that generates attitude estimates $X_{att}$ in response to absolute and inertial attitude signals from its attitude sensors 63. An attitude controller 64 compares the attitude estimates $X_{att}$ to a service attitude $A_{srv}$ (e.g., one that facilitates communication between the communication system 52 and the service area 55 of FIG. 1A) and sends command signals that correspond to the difference to a torque generator 66. In response, the torque generator generates torques in the spacecraft body 68 that urge it to the service attitude $A_{srv}$. Corrections in the body attitude form a feedback path 70 to the attitude sensors 63. The attitude control system 60 and the communication system 52 are powered by currents generated in solar panels 72.

Figure 3:
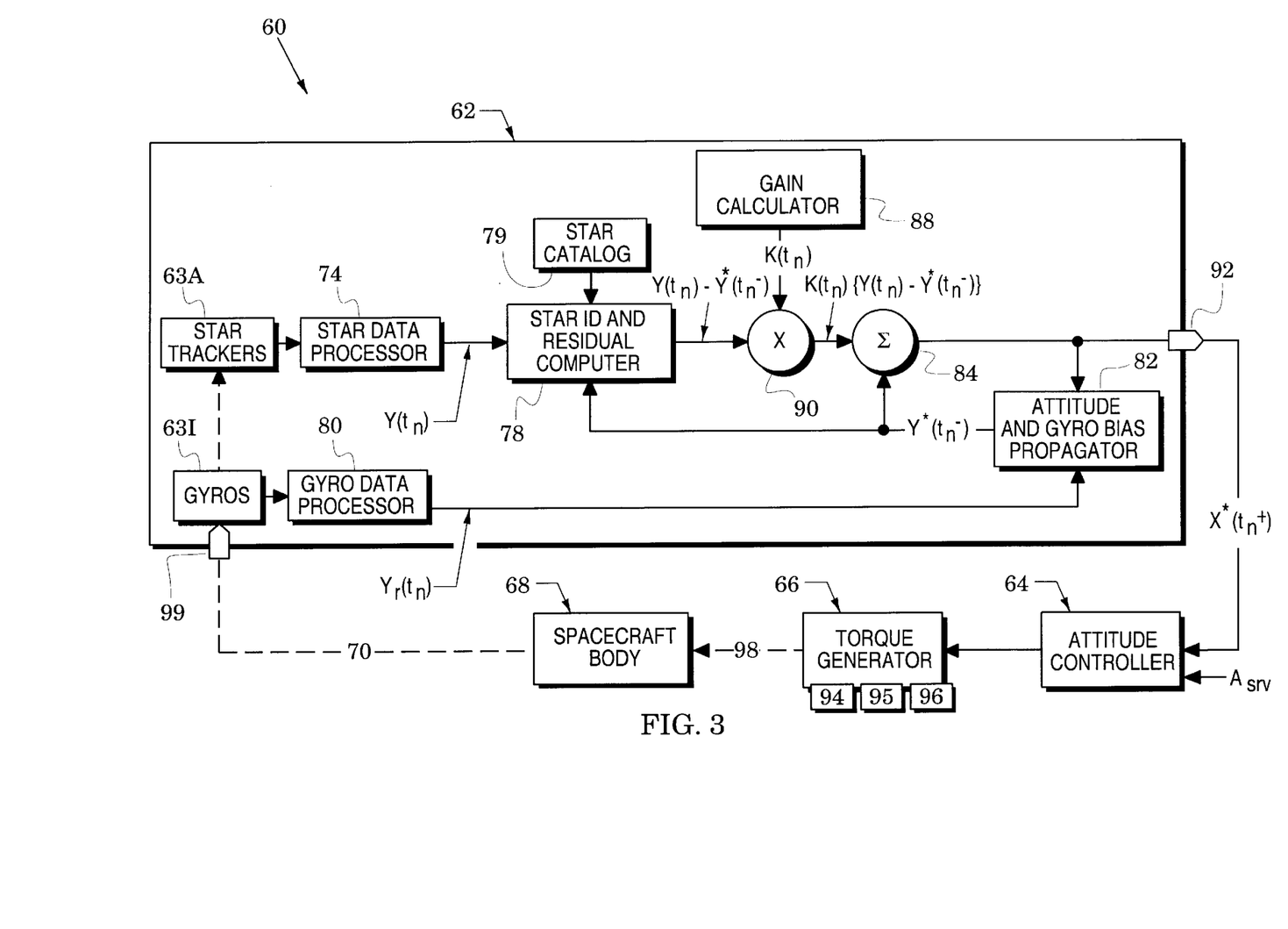
FIG. 3 is a detailed block diagram of the attitude control system of FIG. 2.

The attitude estimation system 62 of the attitude control system 60 is shown in greater detail in FIG. 3 in which $t_n$ represents successive times, $t_n^-$ is a time just prior to a respective $t_n$ and $t_n^+$ is a time just after a respective $t_n$. In order to emphasize the successive times $t_n$ the attitude estimates $X_{att}$ of FIG. 2 are equivalently expressed as $X^*(t_n^+)$. The attitude sensors 63 of FIG. 2 are shown as an absolute-attitude sensor in the form of star trackers 63A and an inertial-attitude sensor in the form of gyroscopes 63I.

Data from the star trackers is processed in a star data processor 74 and provided to a star identification (ID) and residual computer 78 which matches it to data in a star catalog 79 to form attitude measurements $Y(t_n)$. Data from the gyros is processed in a gyro data processor 80 to provide attitude rate measurements $Y_r(t_n)$ to an attitude and gyro bias propagator 82.

In response to the attitude measurements $Y(t_n)$ and attitude rate measurements $Y_r(t_n)$, the attitude estimation system 62 generates estimates X* of the spacecraft's attitude X. In response to each attitude estimate $X^*(t_n^+)$ that corresponds to a time just after the measurements $Y(t_n)$ and $Y_r(t_n)$, the attitude and gyro bias propagator 82 extrapolates a predicted attitude $Y^*(t_n^-)$ that corresponds to a time just before a successive measurement and provides it to the star ID and residual computer 78 and to a summer 84.

The star ID and residual computer 78 forms a residue $Y(t_n)-Y^*(t_n^-)$ which is the difference between the successive attitude measurement and the extrapolated predicted attitude. A gain calculator 88 provides a Kalman gain $K(t_n)$ which multiplies the residue in a multiplier 90 to form an attitude correction $K(t_n)\{Y(t_n)-Y^*(t_n^-)\}$ which is provided to the summer 84. The sum of the predicted attitude $Y^*(t_n^-)$ and the attitude correction $K(t_n)\{Y(t_n)-Y^*(t_n^-)\}$ updates the attitude estimate $X^*(t_n^+)$ and it is provided at an output port 92.

In the attitude controller 64, the attitude estimate $X^*(t_n^+)$ is compared to the service attitude $A_{srv}$ to generate a correction signal that is applied to the torque generator 66 which may, in particular, comprise momentum wheels 94, thrusters 95 and/or magnetic torquers 96. A generated torque 98 corrects attitude of the spacecraft body 68 and this correction forms the feedback path 70 to a system input port 99 and the attitude sensors 63A and 63I.

The star ID and residual computer 78, the attitude and gyro bias propagator 82, the summer 84, the multiplier 90 and the gain calculator 88 of FIG. 3 form a Kalman filter. This filter combines a statistical analysis of system measurement errors with a system state model to derive an estimate of the state of the attitude control system which includes attitude and gyroscope errors (e.g., bias, scale factor and misalignment errors).

In the filter of FIG. 3, a current attitude estimate $X^*(t_n^+)$ at the output port 92 is extrapolated by the attitude and gyro bias propagator 82 to form the predicted attitude $Y^*(t_n^-)$ which is then updated with the correction $K(t_n)\{Y(t_n)-Y^*(t_n^-)\}$ in the summer 84 to form a successive attitude estimate $X^*(t_n^+)$. Similar extrapolation and updating is performed in the gain calculator 88 to generate the Kalman gain that is used to form the correction.

Figure 4:
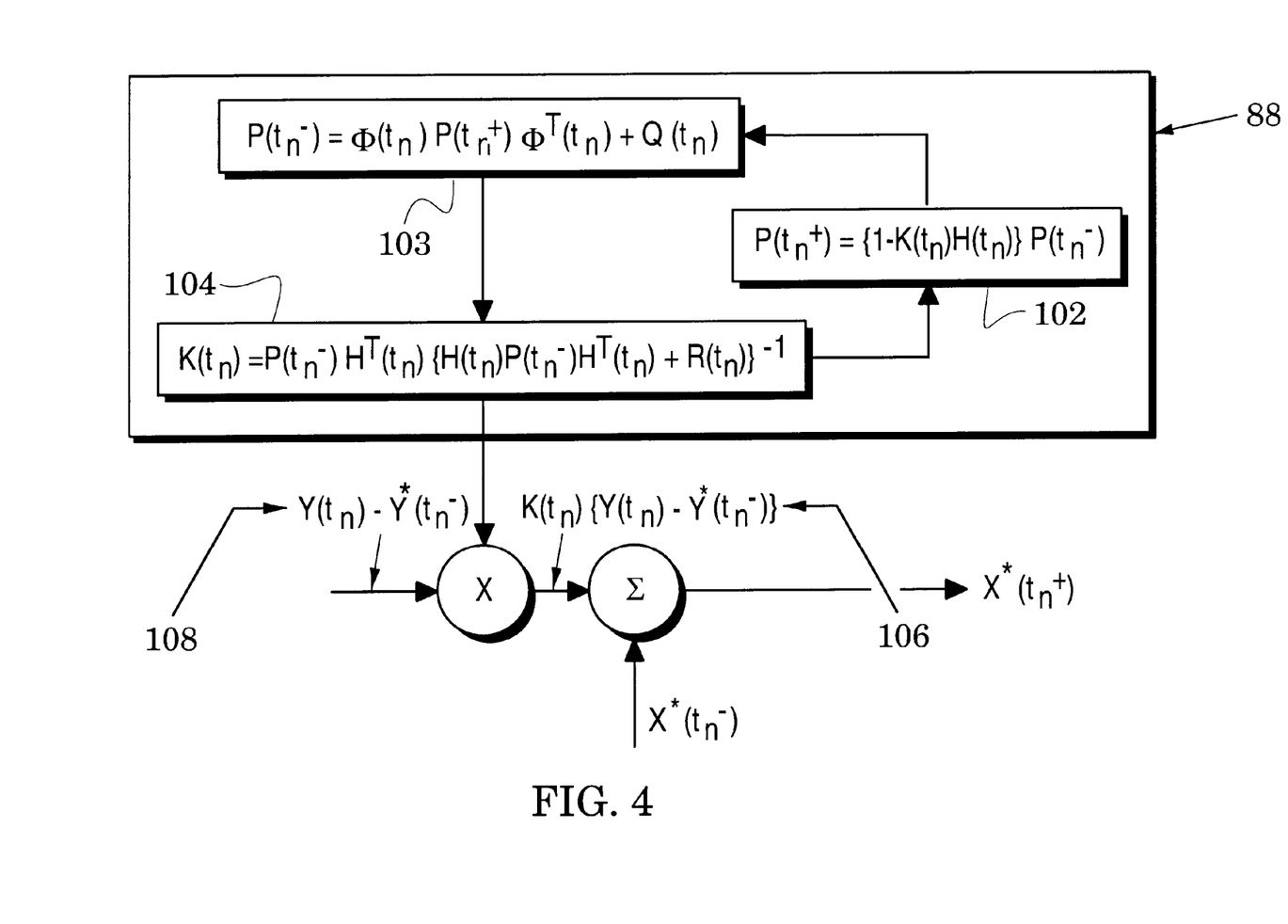
FIG. 4 is a block diagram that illustrates processes in the attitude control system of FIG. 3.

This latter extrapolation and updating is shown in FIG. 4 which repeats the summer 84 and the multiplier 90 and expands the gain calculator 88. In particular, an error covariance $P(t_n)$ characterizes the variance of the system's errors or, equivalently, its estimates and a measurement sensitivity $H(t_n)$ characterizes the sensitivity of the system's measurements to transitions $\Phi(t_n)$ in the system's state. In an update step 102, the error covariance $P(t_n^-)$ before the last measurement is multiplied by $1-K(t_n)H(t_n)$ to update it to an error covariance $P(t_n^+)$ just after the last measurement (wherein I is the identity).

The updated error covariance is extrapolated in extrapolation step 103 to an error covariance $P(t_n^-)$ just before the next successive measurement by multiplying it with the state transition $\Phi(t_n)$ and its transpose $\Phi^T(t_n)$ and summing the result with the system's process noise $Q(t_n)$ which characterizes the measurement variances of the gyroscopes (63I in FIG. 3).

In a gain step 104, the Kalman gain $K(t_n)$ for the next successive measurement is then determined by multiplying the error covariance $P(t_n^-)$ by the transform of the measurement sensitivity $H(t_n)$ and by the inverse of a quantity which is the sum of the system's measurement-noise variance $R(t_n)$ with a product of the measurement sensitivity $H(t_n)$, the error covariance $P(t_n^-)$ and the transform of the measurement sensitivity. The measurement-noise variance $R(t_n)$ characterizes the measurement variances of the star trackers (63A in FIG. 3).

The Kalman gain $K(t_n)$ is thus a ratio of the system's estimate variance to the sum of its estimate variance and its measurement variance. In the beginning of the estimate process, the estimate variance is large so that the gain $K(t_n)$ approaches one and the correction 106 is substantially equal to the residue 108. That is, more weight is given to the most recent measurement than to the latest estimate.

As the estimate process continues, the estimate variance reduces below the measurement variance (i.e., the estimate becomes more accurate than the measurement) and the correction 106 is a small portion of the residue 108. That is, more weight is given to the latest estimate than to the most recent measurement.

Attention is now returned to the invention which has recognized that a spacecraft attitude control system such as the system 60 of FIG. 3 generates an attitude estimate $X^*(t_n^+)$ that is based on an estimate of the error variances (e.g., bias, scale factor and misalignment variances) in an initial set of gyroscopes (63I in FIG. 3). Because the error variances of a substituted set of redundant gyroscopes are initially unknown and because they are typically different, they will introduce significant errors in the attitude estimate $X^*(t_n^+)$ and the predicted attitude $Y^*(t_{n-})$ of FIG. 4. Because the Kalman gain $K(t_n)$ has been previously reduced to a small value, significant weight is given to the predicted attitude $Y^*(t_n^-)$ and little weight is given to current measurements $Y(t_n)$. Accordingly, corrections of errors in the attitude estimate $X^*(t_n^+)$ proceed slowly.

The invention also recognizes that if the capture range of the absolute-attitude sensors is not significantly larger than the errors in the attitude estimate $X^*(t_n^+)$, the attitude control system is in danger of driving the sensors out of their capture range at which point their attitude data becomes invalid. As a result, control of the spacecraft's attitude may be lost which can lead to temporary or even permanent loss of the spacecraft's service.

In response to this recognition, the invention provides spacecraft methods and structures that enhance attitude control when at least one redundant inertial-attitude sensor is substituted for at least one initial inertial-attitude sensor. A method embodiment is shown in the flow chart 120 of FIG. 5.

Figure 5:
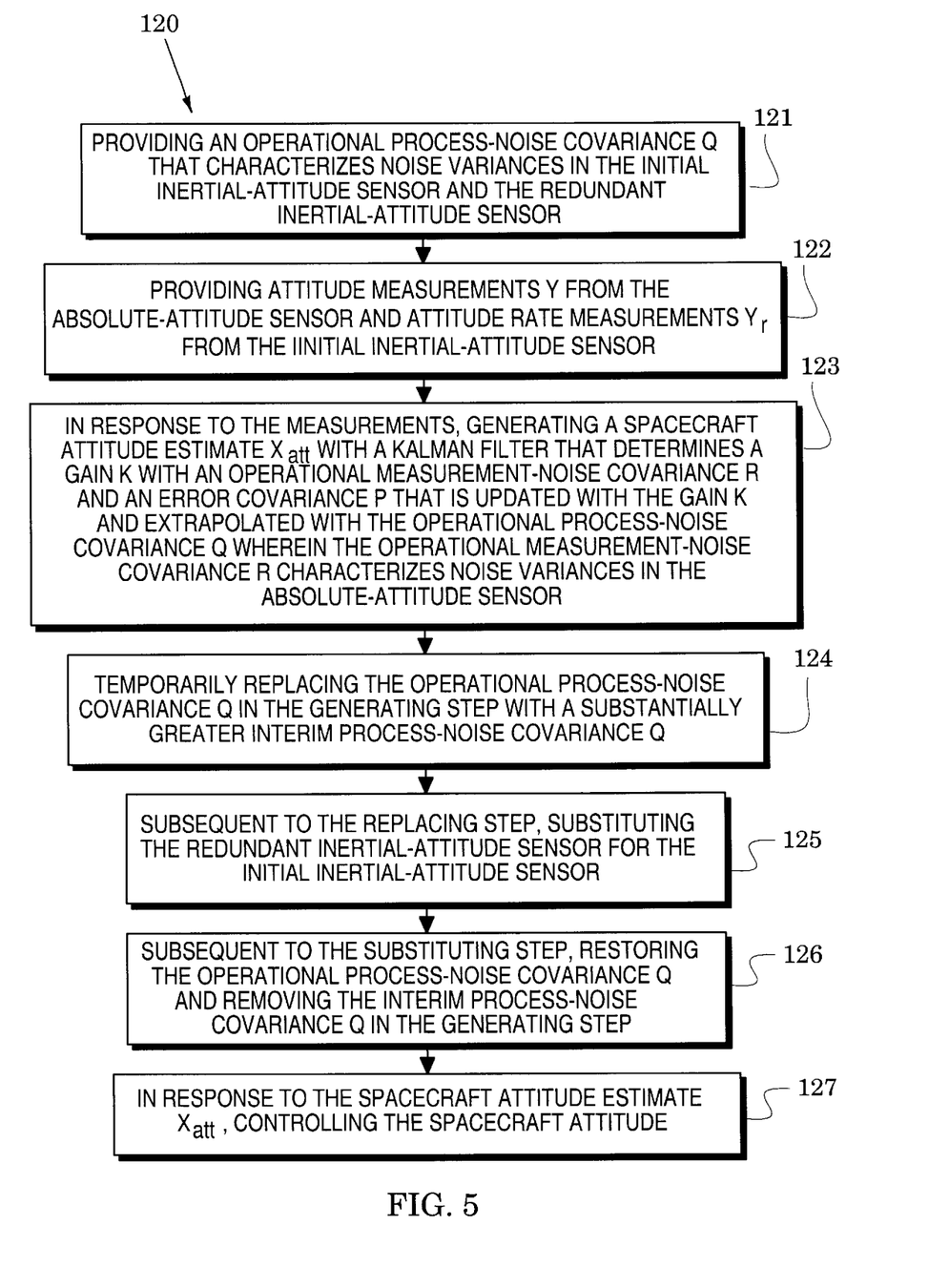
FIG. 5 is a flow chart that illustrates an attitude control method that is practiced with the spacecraft of FIG. 2.

In a first process step 121 of FIG. 5, an operational process-noise covariance Q is provided that characterizes noise variances in the initial inertial-attitude sensor and the redundant inertial-attitude sensor. Attitude measurements Y and attitude rate measurements $Y_r$ are provided in process step 122 with absolute-attitude sensors and the initial inertial-attitude sensor.

In response to the measurements, a spacecraft attitude estimate $X_{att}$ is generated in process step 123 with a Kalman filter that determines a gain K with an operational measurement-noise covariance R and an error covariance P that is updated with the gain K and extrapolated with the operational process-noise covariance Q wherein the operational measurement-noise covariance R characterizes noise variances in the absolute-attitude sensor.

Process step 124 temporarily replaces the operational process-noise covariance Q in the generating step with an interim process-noise covariance Q that is substantially greater than the operational process-noise covariance Q. Subsequent to the replacing step, the redundant inertial-attitude sensor is substituted in process step 125 for the initial inertial-attitude sensor in the generating step.

In process step 126 which is subsequent to the substituting step, the operational process-noise covariance Q is restored and the interim process-noise covariance Q is removed in the generating step. As recited in process step 127, process steps 121–126 facilitate attitude control of the spacecraft by generating the spacecraft attitude estimate $X_{att}$. The latter step includes various other processes such as torque generation in the spacecraft body to urge it to the service attitude.

It is apparent from steps 103 and 104 of FIG. 4, that the greater interim process-noise covariance Q increases the Kalman gain K so that a larger portion of the residue 108 appears in the correction 106. A greater weight is therefore placed upon the most recent attitude measurements Y from the star trackers (63A in FIG. 3). This attitude information permits the attitude and gyro bias propagator 82 of FIG. 3 to hasten its reduction of attitude and gyroscope bias errors (i.e., converge more rapidly on the estimates).

Accordingly, the accuracy of the attitude estimate $X_{att}$ is enhanced and the time required for this realization is shortened. Because greater weight is placed on the most recent attitude measurements and, hence, less weight on the latest predicted attitudes, the error effect of the uncompensated redundant gyroscopes is reduced and the star trackers 63A of FIG. 3 are not driven out of their capture range.

Figure 6:
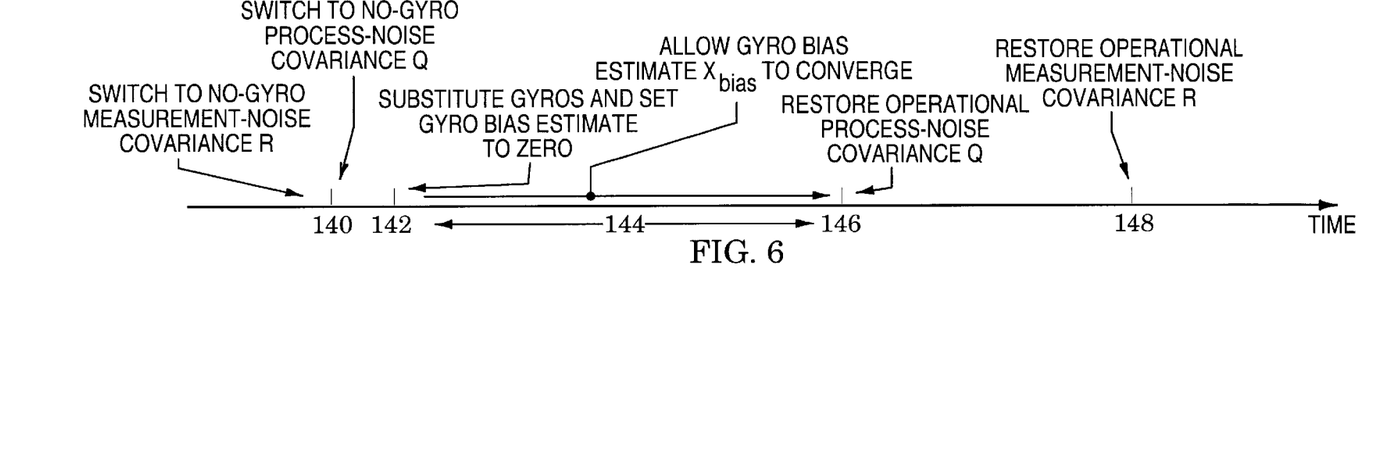
FIG. 6 is a graph which shows a timeline for another attitude control method.
Figure 7:
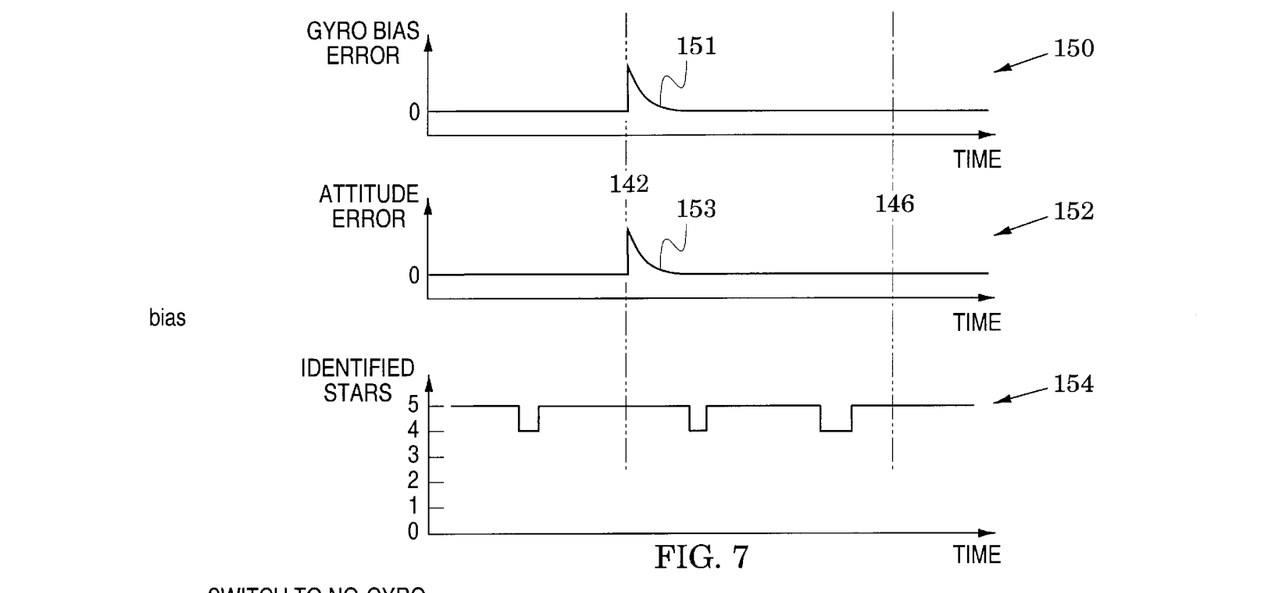
FIG. 7 is a graph similar to FIG. 1B which shows attitude error and number of tracked and identified stars when a method corresponding to the timeline of FIG. 6 is used in the spacecraft of FIG. 2.

FIGS. 6 and 7 illustrate timing and results of a more detailed method embodiment. At a time 140 of FIGS. 6 and 7, the attitude control system is switched to the interim process-noise covariance Q (step 124 in FIG. 5). Just prior to this, the operational measurement-noise variance R is replaced by a substantially larger interim measurement-noise variance R. As indicated by step 104 of FIG. 4, this has the effect of reducing transients that otherwise result from the substantially larger interim process-noise covariance Q.

The initial gyroscope set is turned off, the redundant set is turned on and allowed to warm up and a gyroscope bias estimate $X_{bias}$ is initialized at a predetermined value $X_{bias_{prd}}$ (e.g., at zero) at time 142. During a subsequent time span 144, the attitude estimation system (60 in FIG. 3) converges on estimates of the gyroscope bias. This is monitored by observing when a bias portion $P_{bias}$ of the error covariance P decreases below a predetermined threshold $P_{bias_{thld}}$.

After this convergence is complete at a time 146, the system is returned to the operational process-noise covariance Q and at later time 148, it is returned to the operational measurement-noise variance R. The time 148 is preferably delayed by a period (e.g., 30 minutes) to allow further convergence of the Kalman filter.

FIG. 7 includes graphs 150 and 152 in which plots 151 and 153 show gyroscope bias error and spacecraft attitude error that were generated in a simulation of the processes of FIG. 6. FIG. 7 also includes a graph 154 of tracked and identified stars during the simulation. It is observed that the gyroscope bias and the attitude error show a step increase when the redundant gyroscopes are substituted but the error decays to a steady state value prior to the time 146 when the operational process-noise covariance Q is restored. It is also observed that the number of tracked and identified stars was always at least four. The simulation results of FIG. 7 verify that spacecraft attitude control is maintained and the star trackers are not driven out of their capture range.

Process step 124 of FIG. 5 temporarily replaces the operational process-noise covariance Q in the generating step with an interim process-noise covariance Q that is substantially greater than the operational process-noise covariance Q. In other methods of the invention, this step is replaced by a step of temporarily replacing an operational error covariance P in the generating step with an interim error covariance P that is substantially greater than the operational error covariance P. Although this process variation will also achieve the results shown in the simulation of FIG. 7, it causes a more abrupt change in the Kalman gain and, accordingly, it requires time synchronization with the gyroscope substitution.

In attitude control simulations, it has been determined that the interim process-noise covariance Q is preferably at least twice the operational process-noise covariance Q and, more preferably, at least five times the operational process-noise covariance Q. It has also been determined that the interim measurement-noise variance R is preferably at least twice than the operational measurement-noise variance R and, more preferably, at least five times the operational measurement-noise variance R.

In exemplary attitude control systems, the parameters of FIG. 4 are typically processed as vectors (e.g., attitude estimate X and attitude measurment Y vectors) and matrices (e.g., process-noise covariance Q and measurement-noise covariance R matrices). An exemplary process-noise covariance Q matrix combines a 3×3 matrix in which the entries represent gyroscope angle variances and another 3×3 matrix in which the entries represent gyroscope rate variances. An exemplary measurement-noise covariance R matrix is a 2×2 matrix whose entries represent horizontal and vertical attitude variances that correspond to the horizontal and vertical ranges of conventional star tracker fields-of-view.

The variance entries in these matrices cause the attitude control system of FIGS. 3 and 4 to reduce the variance of the attitude estimate $X^*(t_n^+)$, i.e., to realize an accurate attitude estimate. Increasing the magnitude of these entries to those of an interim measurement-noise covariance R and an interim process-noise covariance Q enhances stability during gyroscope substitution and they are subsequently returned to their operational values to achieve the lowest variance in the attitude estimate $X^*(t_n^+)$.

FIG. 4 illustrates the updating and extrapolating processes that reduce the Kalman gain $K(t_n)$ and reduce the error covariance $P(t_n)$. Fixed gain filters are also suited for use in spacecraft attitude control systems. In these filters, the gain is not successively updated and extrapolated but is set to one or more predetermined fixed gains. Although fixed gain filters lack the adaptability of Kalman filters, they significantly reduce the number of processing steps and are easier to implement.

When the teachings of the invention are practiced with fixed gain filters, an operational gain is replaced with a substantially greater interim gain that places greater weight on the attitude measurements of the absolute-attitude sensors and speeds estimation of gyroscope errors to thereby achieve faster convergence. After an interim period in which the redundant gyroscopes are substituted and system transients allowed to stabilize, the fixed gain is reduced to the operational gain.

The preferred embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A method of enhancing attitude control of a spacecraft when at least one redundant inertial-attitude sensor is substituted for at least one initial inertial-attitude sensor, the method comprising the steps of:

providing an operational process-noise covariance Q that characterizes noise variances in said initial inertial-attitude sensor and said redundant inertial-attitude sensor;

in response to attitude measurements Y from at least one absolute-attitude sensor and attitude-rate measurements $Y_r$ from said initial inertial-attitude sensor, generating a spacecraft attitude estimate $X_{att}$ with a Kalman filter that determines a gain K with an operational measurement-noise covariance R and an error covariance P that is updated with said gain K and extrapolated with said operational process-noise covariance Q wherein said operational measurement-noise covariance R characterizes noise variances in said absolute-attitude sensor;

temporarily replacing said operational process-noise covariance Q in said generating step with an interim process-noise covariance Q that is substantially greater than said operational process-noise covariance Q;

subsequent to said replacing step, substituting said redundant inertial-attitude sensor for said initial inertial-attitude sensor in said generating step;

subsequent to said substituting step, restoring said operational process-noise covariance Q and removing said interim process-noise covariance Q in said generating step; and in response to said spacecraft attitude estimate $X_{att}$, controlling the attitude of said spacecraft.

2. The method of claim 1, wherein said interim process-noise covariance Q is at least twice said operational process-noise covariance Q.

3. The method of claim 1, wherein said interim process-noise covariance Q is at least five times said operational process-noise covariance Q.

4. The method of claim 1, wherein:

said generating step includes the step of generating a gyroscope bias estimate $X_{bias}$; and said error covariance P includes a gyroscope bias error covariance component $P_{bias}$;

and further including the step of delaying said restoring and removing step until said gyroscope bias error covariance component $P_{bias}$ decreases below a predetermined threshold $P_{bias_{thld}}$.

5. The method of claim 4, wherein said delaying step includes the step of initially setting said gyroscope bias estimate $X_{bias}$ to a predetermined gyroscope bias estimate $X_{bias_{prd}}$.

6. The method of claim 5, wherein said predetermined gyroscope bias estimate $X_{bias_{prd}}$ is substantially zero.

7. The method of claim 1, wherein said generating step includes the step of generating a gyroscope bias estimate $X_{bias}$ and further including the steps of:

prior to said replacing step, temporarily inserting an interim measurement-noise covariance R for said operational measurement-noise covariance R in said generating step wherein said interim measurement-noise covariance R is substantially greater than said operational measurement-noise covariance R; and subsequent to said restoring and removing step, replacing said interim measurement-noise covariance R with said operational measurement-noise covariance R in said generating step.

8. The method of claim 7, wherein said interim measurement-noise covariance R is at least twice said operational measurement-noise covariance R.

9. The method of claim 7, wherein said interim measurement-noise covariance R is at least five times said operational measurement-noise covariance R.

10. The method of claim 7, further including the step of delaying the replacement of said interim measurement-noise covariance R with said operational measurement-noise covariance R for a delay time $T_d$ to allow further convergence of said Kalman filter.

11. The method of claim 10, wherein said delay time $T_d$ is at least 15 minutes.

12. The method of claim 7, wherein the noise variances of said initial inertial-attitude sensor includes angle variances and angle rate variances.

13. The method of claim 1, wherein said absolute-attitude sensor is a star tracker and the noise variances in said initial inertial-attitude sensor comprise horizontal and vertical star tracker noise variances.

14. A method of enhancing attitude control of a spacecraft when at least one redundant inertial-attitude sensor is substituted for at least one initial inertial-attitude sensor, the method comprising the steps of:

in response to attitude measurements Y from at least one absolute-attitude sensor and attitude-rate measurements $Y_r$ from said initial inertial-attitude sensor, generating a spacecraft attitude estimate $X_{att}$ with a filter that corrects said attitude estimate $X_{att}$ with a correction that is the product of an operational gain and a residue which is the difference between said attitude estimate $X_{att}$ and successive attitude measurements Y;

temporarily replacing said operational gain in said generating step with an interim gain that is substantially greater than said operational gain;

subsequent to said replacing step, substituting said redundant inertial-attitude sensor for said initial inertial-attitude sensor in said generating step;

subsequent to said substituting step, restoring said operational gain and removing said interim gain in said generating step; and in response to said spacecraft attitude estimate $X_{att}$, controlling the attitude of said spacecraft.

15. The method of claim 14, wherein said interim gain is at least twice said operational gain.

16. The method of claim 14, wherein said interim gain is at least five times said operational gain.

17. The method of claim 14, wherein said delaying step includes the step of initially setting said gyroscope bias estimate $X_{bias}$ to a predetermined gyroscope bias estimate $X_{bias_{prd}}$.

18. The method of claim 17, wherein said predetermined gyroscope bias estimate $X_{bias_{prd}}$ is substantially zero.

19. A spacecraft configured for enhanced attitude control when at least one redundant inertial-attitude sensor is substituted for at least one initial inertial-attitude sensor, the spacecraft comprising:

a satellite body;

an attitude control system that includes:
  a) at least one initial inertial-attitude sensor in said attitude control system;
  b) at least one redundant inertial-attitude sensor; and
  c) at least one absolute-attitude sensor in said attitude control system;

at least one solar panel carried by said body to provide power to said attitude control system; and at least one data processor in said attitude control system that is programmed to perform the steps of:
  a) providing an operational process-noise covariance Q that characterizes noise variances in said initial inertial-attitude sensor and said redundant inertial-attitude sensor;
  b) in response to attitude measurements Y from at least one absolute-attitude sensor and attitude-rate measurements $Y_r$ from said initial inertial-attitude sensor, generating a spacecraft attitude estimate $X_{att}$ with a Kalman filter that determines a gain K with an operational measurement-noise covariance R and an error covariance P that is updated with said gain K and extrapolated with said operational process-noise covariance Q wherein said operational measurement-noise covariance R characterizes noise variances in said absolute-attitude sensor;
  c) temporarily replacing said operational process-noise covariance Q in said generating step with an interim process-noise covariance Q that is substantially greater than said operational process-noise covariance Q;
  d) subsequent to said replacing step, substituting said redundant inertial-attitude sensor for said initial inertial-attitude sensor in said generating step;
  e) subsequent to said substituting step, restoring said operational process-noise covariance Q and removing said interim process-noise covariance Q in said generating step; and
  f) in response to said spacecraft attitude estimate X, controlling the attitude of said spacecraft with said attitude control system.

20. The spacecraft of claim 19, wherein said attitude control system includes a torque generation system that is coupled to generate torques in said spacecraft to facilitate said controlling step.

21. The spacecraft of claim 20, wherein said torque generation system includes a momentum wheel.

22. The spacecraft of claim 20, wherein said torque generation system includes a thruster.

23. A spacecraft configured for enhanced attitude control when at least one redundant inertial-attitude sensor is substituted for at least one initial inertial-attitude sensor, the spacecraft comprising:

a satellite body;

an attitude control system that includes:
  a) at least one initial inertial-attitude sensor in said attitude control system;
  b) at least one redundant inertial-attitude sensor in said attitude control system; and
  c) at least one absolute-attitude sensor in said attitude control system;

at least one solar panel carried by said body to provide power to said attitude control system; and at least one data processor in said attitude control system that is programmed to perform the steps of:
  a) in response to attitude measurements Y from at least one absolute-attitude sensor and attitude-rate measurements $Y_r$ from said initial inertial-attitude sensor, generating a spacecraft attitude estimate $X_{att}$ with a filter that corrects said attitude estimate $X_{att}$ with a correction that is the product of an operational gain and a residue which is the difference between said attitude estimate $X_{att}$ and successive attitude measurements Y;
  b) temporarily replacing said operational gain in said generating step with an interim gain that is substantially greater than said operational gain;
  c) subsequent to said replacing step, substituting said redundant inertial-attitude sensor for said initial inertial-attitude sensor in said generating step;
  d) subsequent to said substituting step, restoring said operational gain and removing said interim gain in said generating step; and
  e) in response to said spacecraft attitude estimate $X_{att}$, controlling the attitude of said spacecraft.

24. The spacecraft of claim 23, wherein said attitude control system includes a torque generation system that is coupled to generate torques in said spacecraft to facilitate said controlling step.

25. The spacecraft of claim 24, wherein said torque generation system includes a momentum wheel.

26. The spacecraft of claim 24, wherein said torque generation system includes a thruster.

* * * * *